United States Patent
Kadowaki

(10) Patent No.: US 7,539,345 B2
(45) Date of Patent: May 26, 2009

(54) METHOD OF PROCESSING IMAGE AND AUDIO INFORMATION, IMAGE AND AUDIO PROCESSING APPARATUS AND COMPUTER PROGRAM THAT CAUSES A COMPUTER TO PROCESS IMAGE AND AUDIO INFORMATION

(75) Inventor: Yukio Kadowaki, Nara (JP)

(73) Assignee: Ricoh Company, Ltd., Tokyo (JP)

( * ) Notice: Subject to any disclaimer, the term of this patent is extended or adjusted under 35 U.S.C. 154(b) by 771 days.

(21) Appl. No.: 10/510,136

(22) PCT Filed: Apr. 28, 2003

(86) PCT No.: PCT/JP03/05459

§ 371 (c)(1),
(2), (4) Date: Oct. 4, 2004

(87) PCT Pub. No.: WO03/094504

PCT Pub. Date: Nov. 13, 2003

(65) Prior Publication Data

US 2005/0147159 A1 Jul. 7, 2005

(30) Foreign Application Priority Data

Apr. 30, 2002 (JP) ............................. 2002-128682

(51) Int. Cl.
*G06K 9/36* (2006.01)
*G06K 9/46* (2006.01)
*H04B 1/66* (2006.01)
*H04N 7/12* (2006.01)
*H04N 1/41* (2006.01)
*G06F 15/00* (2006.01)
*G10L 19/00* (2006.01)

(52) U.S. Cl. .................. 382/232; 375/240; 348/384.1; 358/426.01; 704/200; 704/500

(58) Field of Classification Search ......... 382/232–253; 375/240–254; 348/384.1–440.1; 358/426.01–426.16; 704/200–230, 500–504
See application file for complete search history.

(56) References Cited

U.S. PATENT DOCUMENTS 4,817,182 A * 3/1989 Adelson et al. ............. 382/248

(Continued)

FOREIGN PATENT DOCUMENTS

EP 0869620 A2 10/1998

(Continued)

OTHER PUBLICATIONS

Y. Nomizu, "Next Generation Image Coding Method JPEG 2000", Feb. 13, 2001, Triceps.

(Continued)

*Primary Examiner*—Matthew C Bella
*Assistant Examiner*—Manav Seth
(74) *Attorney, Agent, or Firm*—Cooper & Dunham, LLP

(57) ABSTRACT

A method of processing image information in which the image information is encoded by the bit plane and compressed by truncating one or more of the bit planes. Since the index parameter indexing the effect of the truncation on the quality of the image information is generated before the truncation, one can determine the bit planes to be truncated based on the index parameter without decoding the image information.

20 Claims, 15 Drawing Sheets

U.S. PATENT DOCUMENTS

| | | | |
|---|---|---|---|
| 5,014,134 A * | 5/1991 | Lawton et al. | 382/240 |
| 5,471,207 A * | 11/1995 | Zandi et al. | 341/107 |
| 5,631,977 A | 5/1997 | Koshi et al. | |
| 5,659,631 A * | 8/1997 | Gormish et al. | 382/166 |
| 5,793,892 A * | 8/1998 | Pan et al. | 382/232 |
| 5,867,602 A * | 2/1999 | Zandi et al. | 382/248 |
| 5,881,173 A * | 3/1999 | Ohmori | 382/232 |
| 6,215,421 B1 * | 4/2001 | Kondo et al. | 341/50 |
| 6,462,681 B1 * | 10/2002 | Van Der Vleuten et al. | 341/50 |
| 6,947,484 B2 * | 9/2005 | Inagaki et al. | 375/240.02 |
| 7,020,342 B1 * | 3/2006 | Kleihorst et al. | 382/250 |
| 7,212,677 B2 * | 5/2007 | Mishima | 382/237 |
| 2001/0021223 A1 | 9/2001 | Andrew | |

FOREIGN PATENT DOCUMENTS

| | | |
|---|---|---|
| GB | 2303031 A | 2/1997 |
| JP | 06225153 | 8/1994 |
| JP | 08298555 | 11/1996 |
| JP | 09083808 | 3/1997 |
| JP | 2000-188552 | 7/2000 |
| JP | 2001-320588 | 11/2001 |
| JP | 2002-185962 | 6/2002 |
| JP | 2003-101787 | 4/2003 |
| JP | 2003-101788 | 4/2003 |
| JP | 2003-304405 | 10/2003 |

OTHER PUBLICATIONS

Taubman, David, "High Performance Scalable Image Compression With EBCOT", IEEE Transactions On Image Processing, vol. 9, No. 7, July 2000.

Jizheng, Xu et al.; "Compression Of M-Fish Images Using 3-D ESCOT" Proceedings 2001 International Conference On Image Processing, ICIP 2001, vol. 1 of 3, Conf. 8, Oct. 7, 2001, pp. 109-112.

"JPEG 2000 Part I Final Committee Draft Version 1.0", Mar. 16, 2000.

* cited by examiner

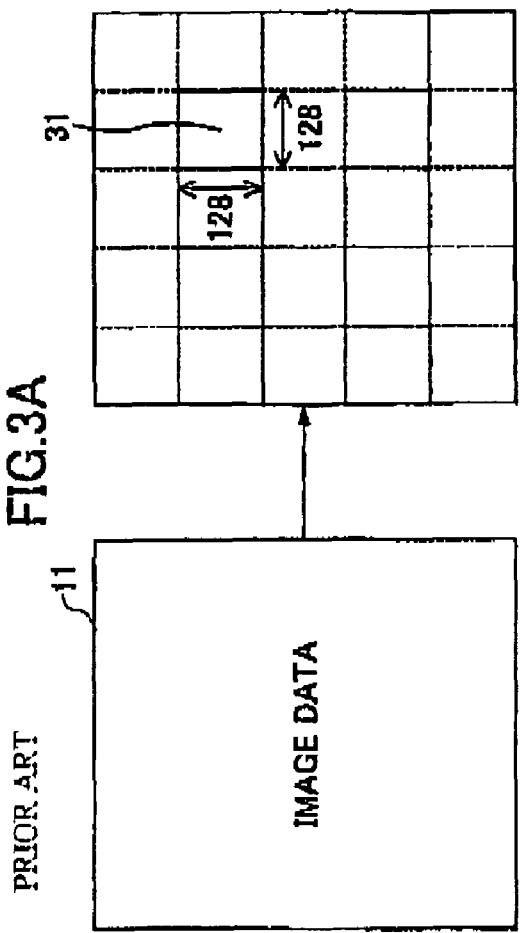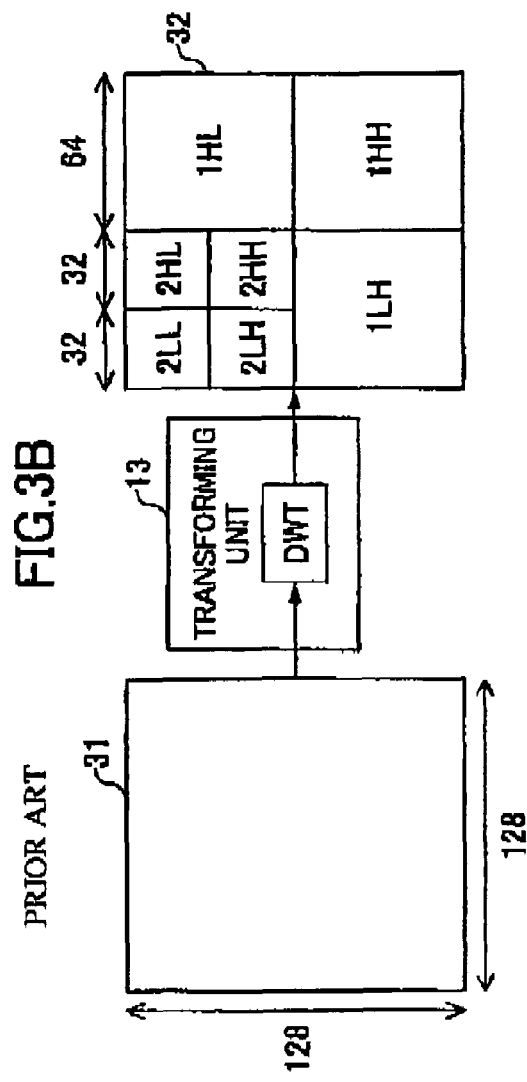

FIG.4

PRIOR ART $$b = \text{sign}(a) \cdot \left[ \frac{|a|}{\Delta} \right]$$

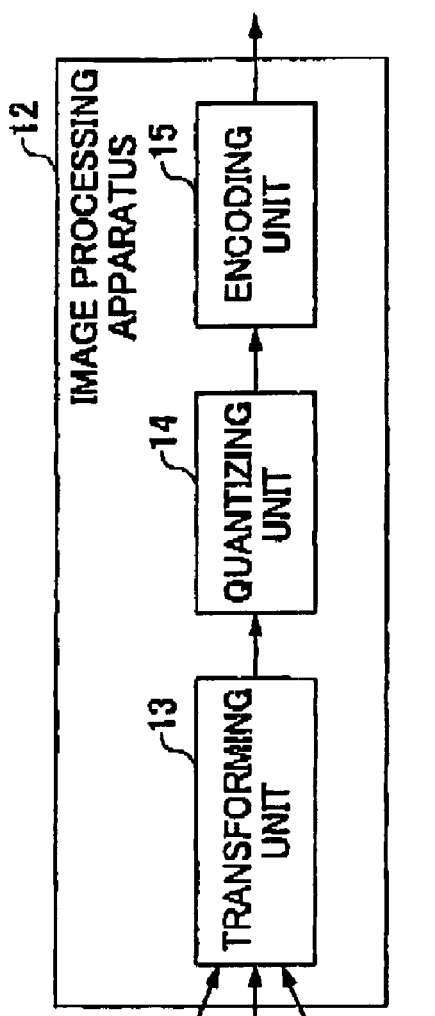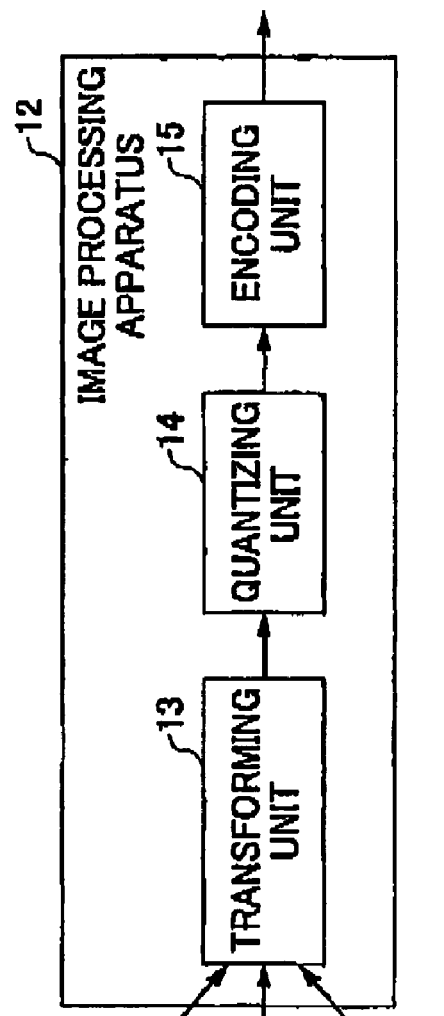

|  | BIT | 0 | 1 | 2 | 3 | 4 | 5 | 6 | 7 | 8 | 9 | 10 | 11 | 12 | 13 | 14 | 15 |
|---|---|---|---|---|---|---|---|---|---|---|---|---|---|---|---|---|---|
| LAYER 12 | | | | | | | | | | | | | | | | | |
| LAYER 11 | | ■ | | | | | | | | | | | | | | | |
| LAYER 10 | | | ■ | ■ | | | | | | | | | | | | | |
| LAYER 9 | | ■ | | ■ | | | | | | | | | | | | | |
| LAYER 8 | | ■ | ■ | ■ | | ■ | | | ■ | | | ■ | | | | | |
| LAYER 7 | | | ■ | | ■ | | ■ | ■ | ■ | ■ | ■ | | ■ | | | | |
| LAYER 6 | | | | | | | | | | | | | | | | | |
| LAYER 5 | | | | | | | | | | | | | | | | | |
| LAYER 4 | | | | | | | | | | | | | | | | | |
| LAYER 3 | | | | | | | | | | | | | | | | | |
| LAYER 2 | | | | | | | | | | | | | | | | | |
| LAYER 1 | | | | | | | | | | | | | | | | | |

FIG.12

|  | BIT | 0 | 1 | 2 | 3 | 4 | 5 | 6 | 7 | 8 | 9 | 10 | 11 | 12 | 13 | 14 | 15 |
|---|---|---|---|---|---|---|---|---|---|---|---|---|---|---|---|---|---|
| LAYER 12 | | | | | | | | | | | | | | | | | |
| LAYER 11 | | ■ | | | | | | | | | | | | | | | |
| LAYER 10 | | | ■ | ■ | | | | | | | | | | | | | |
| LAYER 9 | | ■ | | ■ | | | | | | | | | | | | | |
| LAYER 8 | | ■ | ■ | ■ | | ■ | | | ■ | | | ■ | | | | | |
| LAYER 7 | | | | | | | | | | | | | | | | | |
| LAYER 6 | | | | | | | | | | | | | | | | | |
| LAYER 5 | | | | | | | | | | | | | | | | | |
| LAYER 4 | | | | | | | | | | | | | | | | | |
| LAYER 3 | | | | | | | | | | | | | | | | | |
| LAYER 2 | | | | | | | | | | | | | | | | | |
| LAYER 1 | | | | | | | | | | | | | | | | | |

FIG.13

|  | BIT | 0 | 1 | 2 | 3 | 4 | 5 | 6 | 7 | 8 | 9 | 10 | 11 | 12 | 13 | 14 | 15 |
|---|---|---|---|---|---|---|---|---|---|---|---|---|---|---|---|---|---|
| LAYER 12 | | | | | | | | | | | | | | | | | |
| LAYER 11 | | ■ | | | | | | | | | | | | | | | |
| LAYER 10 | | | ■ | ■ | | | | | | | | | | | | | |
| LAYER 9 | | ■ | | ■ | | | | | | | | | | | | | |
| LAYER 8 | | | | | | | | | | | | | | | | | |
| LAYER 7 | | | | | | | | | | | | | | | | | |
| LAYER 6 | | | | | | | | | | | | | | | | | |
| LAYER 5 | | | | | | | | | | | | | | | | | |
| LAYER 4 | | | | | | | | | | | | | | | | | |
| LAYER 3 | | | | | | | | | | | | | | | | | |
| LAYER 2 | | | | | | | | | | | | | | | | | |
| LAYER 1 | | | | | | | | | | | | | | | | | |

FIG.14

|  | BIT | 0 | 1 | 2 | 3 | 4 | 5 | 6 | 7 | 8 | 9 | 10 | 11 | 12 | 13 | 14 | 15 | Na | Nb |
|---|---|---|---|---|---|---|---|---|---|---|---|---|---|---|---|---|---|---|---|
| LAYER 12 | | | | | | | | | | | | | | | | | | 0 | 0 |
| LAYER 11 | | ■ | | | | | | | | | | | | | | | | 1 | 0 |
| LAYER 10 | | | ■ | ■ | | | | | | | | | | | | | | 2 | 1 |
| LAYER 9 | | ■ | | ■ | | | | | | | | | | | | | | 0 | 0 |
| LAYER 8 | | ■ | ■ | | | ■ | | ■ | | | | ■ | | | | | | 3 | 1 |
| LAYER 7 | | | | ■ | | ■ | ■ | ■ | ■ | | ■ | | | | | | | 6 | 2 |
| LAYER 6 | | ■ | | ■ | ■ | | | | | ■ | ■ | | | | | | ■ | 1 | 1 |
| LAYER 5 | | ■ | | | ■ | | ■ | | ■ | | ■ | | ■ | | | | ■ | 1 | 0 |
| LAYER 4 | | ■ | | ■ | ■ | | ■ | | | | ■ | | | | ■ | | ■ | 1 | 0 |
| LAYER 3 | | ■ | | | ■ | | ■ | | ■ | | | ■ | | ■ | | ■ | | 0 | 0 |
| LAYER 2 | | | ■ | | ■ | | ■ | | ■ | | ■ | | ■ | | ■ | | | 1 | 0 |
| LAYER 1 | | ■ | | ■ | | | ■ | ■ | | ■ | | ■ | | ■ | | | ■ | 0 | − |

FIG.15

| BIT | 0 | 1 | 2 | 3 | 4 | 5 | 6 | 7 | 8 | 9 | 10 | 11 | 12 | 13 | 14 | 15 | Na | Nb |
|---|---|---|---|---|---|---|---|---|---|---|---|---|---|---|---|---|---|---|
| LAYER 12 | | | | | | | | | | | | | | | | | 0 | 0 |
| LAYER 11 | ■ | | | | | | | | | | | | | | | | 1 | 0 |
| LAYER 10 | | ■ | | | | | | | | | | | | | | | 1 | 0 |
| LAYER 9 | ■ | | ■ | ■ | | | | | | | | | | | | | 2 | 1 |
| LAYER 8 | | ■ | ■ | | ■ | | | | | | | | | | | | 1 | 0 |
| LAYER 7 | ■ | | | | ■ | | | | | | | | | | | | 2 | 1 |
| LAYER 6 | ■ | | | ■ | ■ | | | ■ | | | | | | | | | 1 | 0 |
| LAYER 5 | | ■ | ■ | ■ | | | | | ■ | ■ | | | ■ | ■ | | | 3 | 2 |
| LAYER 4 | ■ | | ■ | | | ■ | ■ | ■ | | ■ | | ■ | ■ | ■ | | | 3 | 1 |
| LAYER 3 | | ■ | ■ | ■ | ■ | ■ | ■ | ■ | ■ | | ■ | ■ | | | ■ | | 1 | 0 |
| LAYER 2 | ■ | ■ | | ■ | ■ | ■ | | ■ | | ■ | ■ | ■ | | ■ | ■ | ■ | 1 | 0 |
| LAYER 1 | | ■ | | | ■ | ■ | ■ | | ■ | ■ | ■ | ■ | | ■ | | | 0 | – |

FIG.16

| BIT | 0 | 1 | 2 | 3 | 4 | 5 | 6 | 7 | 8 | 9 | 10 | 11 | 12 | 13 | 14 | 15 | Na | Nb |
|---|---|---|---|---|---|---|---|---|---|---|---|---|---|---|---|---|---|---|
| LAYER 12 | | | | | | | | | | | | | | | | | 0 | 0 |
| LAYER 11 | ■ | | ■ | | ■ | | | ■ | | | | | | | | | 4 | 2 |
| LAYER 10 | ■ | | ■ | | | | | | | | | | | | | | 2 | 0 |
| LAYER 9 | ■ | ■ | | | ■ | | | ■ | | | | | | | | | 2 | 0 |
| LAYER 8 | | | ■ | ■ | | | | | | | | | | | | | 0 | 0 |
| LAYER 7 | ■ | | | | | | | ■ | | | | | | | | | 0 | 0 |
| LAYER 6 | | | | | | | ■ | | | | | | | | | | 0 | 0 |
| LAYER 5 | ■ | | | ■ | | | | | | | | | | | | | 0 | 0 |
| LAYER 4 | | | ■ | | ■ | | ■ | | ■ | | | ■ | | | ■ | | 3 | 1 |
| LAYER 3 | | ■ | ■ | ■ | | ■ | ■ | | ■ | | | | | ■ | ■ | | 2 | 1 |
| LAYER 2 | ■ | | ■ | | ■ | ■ | | ■ | | ■ | ■ | | ■ | | ■ | | 2 | 2 |
| LAYER 1 | | ■ | | | ■ | ■ | ■ | | ■ | ■ | ■ | | ■ | | | | 1 | – |

METHOD OF PROCESSING IMAGE AND AUDIO INFORMATION, IMAGE AND AUDIO PROCESSING APPARATUS AND COMPUTER PROGRAM THAT CAUSES A COMPUTER TO PROCESS IMAGE AND AUDIO INFORMATION

TECHNICAL FIELD

The present invention generally relates to a method of processing image and/or audio information, an image and/or audio processing apparatus, and a computer program for processing image and/or audio information.

The present invention more particularly relates to a method of processing image and/or audio information, an image and/or audio processing apparatus, and a computer program for processing image and/or audio information, in which the degrading of the encoded image and/or audio information caused by the truncation of bit planes can be evaluated without decoding the encoded image and/or audio information.

BACKGROUND ART

The Joint Photographic Experts Group (JPEG) and JPEG 2000 are well known international standards of a method of compressing image data.

FIG. 1 is a schematic diagram for explaining a conventional image processing apparatus that compresses image information by JPEG 2000. When image data 11 are input to an image processing apparatus 12, the image data 11 are transformed with discrete wavelet transformation (DWT) by a transforming unit 13, are quantized by a quantizing unit 14, are encoded with entropy coding by an encoding unit 15, and are output as encoded data 16. That is, the image information is compressed in the manner in which the image data 11 are transformed into the encoded data 16.

In this specification, the "image information" includes the image data 11 and any data derived from the image data 11 such as the transformed image data, the quantized image data, and the encoded image data encoded with the entropy encoding.

FIG. 2 is a schematic diagram showing a conventional image processing apparatus that decompresses the image information. When encoded data 21 are input to an image processing apparatus 22, the encoded data 21 are decoded with entropy decoding by a decoding unit 23, are reversely quantized by a reverse quantizing unit 24, are reversely transformed with reverse discrete wavelet transformation by a reverse transforming unit 25, and are output as image data 26. That is, the image information, the encoded data 21 in this case, is decompressed into the image data 26.

The image processing apparatus that compresses the image information and the image processing apparatus that decompresses the image information are often combined as an image processing system.

The transforming unit 13 will be described by reference to FIGS. 3A and 3B. In the case of JPEG 2000, the image data 11 are generally divided into tiles 31 as showed in FIG. 3A. Each tile 31 is transformed with DWT as showed in FIG. 3B. FIGS. 3A and 3B illustrate the case in which the image data 11 are divided into the tiles 31 of 128×128 pixels. If a tile 31 of 128×128 pixels is transformed with DWT of level 2, the transformation generates wavelet coefficient data 32 for three 64×64 sub-bands 1LH, 1HL, and 1HH and four 32×32 sub-bands 2LL, 2LH, 2HL, and 2HH.

The quantizing unit 14 will be described by reference to FIG. 4. FIG. 4 shows an example of formula to be used for quantizing, where "a" and "b" are the wavelet coefficients before and after quantizing, respectively; "|a|" is the absolute value of "a"; "sign(a)" is the sign of "a"; "[ ]" is floor function; and "Δ" is a quantizing step. The wavelet coefficient "a" is quantized to "b" by this formula.

The encoding unit 15 will be described by reference to FIG. 5. In the case of JPEG 2000, the sub-band 52 of the quantized wavelet coefficient data 51 is divided into code blocks 53 as showed in FIG. 5A. (If a sub-band is larger than a code block, the sub-band is divided into the code clocks. In the following description, a code block includes a sub-band that is not divided into code blocks.)

The code blocks 53 are further divided into bit planes 54 as showed in FIG. 5B. Each bit plane is encoded with entropy encoding such as arithmetic encoding as showed in FIG. 5C. FIG. 5A illustrates the case in which the sub-band 52 is divided into the 4×4 code blocks 53. (The size of each code block 53 is 4×4 in this case, but the size is not limited to 4×4.) FIG. 5B illustrates the case in which the 4×4 code block 53 is divided into four bit planes 54. The encoding unit 15 encodes with entropy encoding each bit plane 54 of the quantized wavelet coefficient data 51, and outputs the encoded data 16.

In the above description, the image data 11 are assumed to represent a monochrome image. In the case in which the image data 11 represent a color image, the image data (component) of each color can be input to the image processing apparatus 12 as showed in FIGS. 6A and 6B. The image data represented by RGB format may be directly input to the image processing apparatus 12 as showed in FIG. 6A. The image data represented by RGB format may be converted into another format such as YCbCr format before being input to the image processing apparatus. In the case of JPEG 2000, the image data represented by the RGB format are generally converted into the YCbCr format as showed in FIG. 6B. Since human eyes are not as sensitive to the color difference components (Cb and Cr) as they are to the brightness component (Y), one can increase data compression rate by compressing Cb and Cr more than Y.

As described above, in the case of JPEG 2000, the quantized wavelet coefficient data are divided into bit planes, and encoded by the bit plane. If some bit planes are cut off, the image data are further compressed. For example, the image data can be compressed by cutting off (truncating) the lower side of the encoded bit planes.

If a compression ratio is given as a target, data are cut off until the compression ratio reaches the target. If data are cut off, image quality is degraded. Accordingly, it is necessary to determine, when the data are cut off to a certain extent, how much the image quality degrades.

According to a method of determining the extent of the degrading showed in "Example and Guideline" (EG) of JPEG 2000, the bit planes are truncated one by one from the lowest bit plane to the highest bit plane, and the distortion is obtained after each truncation of a bit plane. For example, the lowest bit plane is truncated, and the distortion is obtained. Then, the second lowest bit plane is additionally truncated, and the distortion is obtained. This procedure is continued until the highest bit plane is truncated and the distortion is obtained. The distortion is obtained by decoding the encoded data after each truncation and comparing the decoded data with the original image data. The distortion is defined as mean squared error (MSE).

Since the encoded data after each truncation are decoded as described above, it takes long time to obtain the distortion. Otherwise, hardware that accelerates the above procedure is additionally required.

BRIEF SUMMARY

In an aspect of the present disclosure, a method of evaluating a distortion caused by truncation of bit planes without decoding encoded data.

A method of processing image information, according to an aspect of the present invention disclosure includes the step of encoding said image information by a bit plane, the step of generating index parameter indexing degradation of said image information caused by truncation of one or more bit planes based on said image information, and the step of compressing said image information by truncating the bit planes; wherein the bit planes to be truncated are determined based on said index parameter.

When truncating the bit planes of the encoded image information, one can evaluate the degradation of the image information caused by the truncation based on the index parameter generated in advance without decoding the image information.

Other features and advantages of the present invention will become more apparent from the following detailed description when read in conjunction with the accompanying drawings.

BRIEF DESCRIPTION OF THE DRAWINGS

FIGS. 3A and 3B are schematic diagrams for explaining a transforming unit;

FIG. 4 shows a formula used for a quantizing unit;

FIGS. 6A and 6B are schematic diagrams for explaining an image processing apparatus that handles a color image;

FIG. 9 is a schematic diagram showing the bit pattern of a layer according to an embodiment;

FIG. 10 is a schematic diagram showing the bit pattern of a layer according to an embodiment where layers 1 through 3 are truncated;

FIG. 11 is a schematic diagram showing the bit pattern of a layer according to an embodiment where layers 1 through 6 are truncated;

FIG. 12 is a schematic diagram showing the bit pattern of a layer according to an embodiment where layers 1 through 7 are truncated;

FIG. 13 is a schematic diagram showing the bit pattern of a layer according to an embodiment where layers 1 through 8 are truncated;

FIG. 14 is a schematic diagram showing the bit pattern of layers and "Na" and "Nb" of each layer;

FIG. 15 illustrates a bit pattern that gradually changes;

FIG. 16 illustrates a bit pattern that steeply changes;

BEST MODE FOR CARRYING OUT THE INVENTION

A detailed description of the preferred embodiments will be described by reference to the drawings.

FIRST EMBODIMENT

Figure 7:
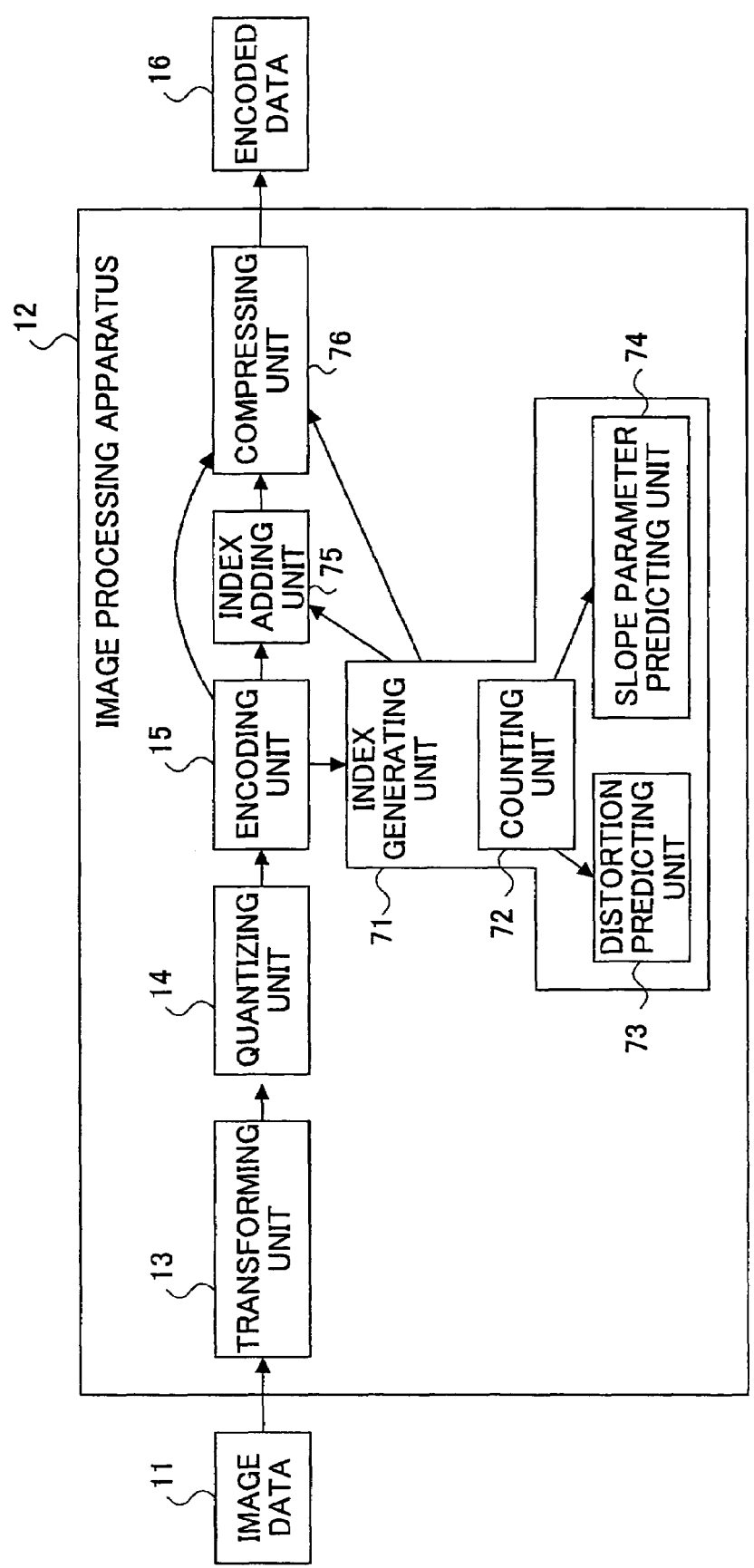
FIG. 7 is a block diagram showing an image processing apparatus according to an embodiment of the present invention.

FIG. 7 is a block diagram showing an image processing apparatus according to an embodiment of the present invention. In FIG. 7, an image processing apparatus 12 is configured by a transforming unit 13, a quantizing unit 14, an encoding unit 15, an index generating unit, a counting unit, 1 distortion predicting unit 73, a slope parameter predicting unit 74, an index adding unit 75, and a compressing unit 76. The image processing apparatus 12 compresses image data with JPEG 2000. The input image data 11 are transformed with the discrete wavelet transformation by the transforming unit 13, quantized by the quantizing unit 14, encoded with entropy codes by the encoding unit 15, and output as the encoded data 16.

Figure 8:
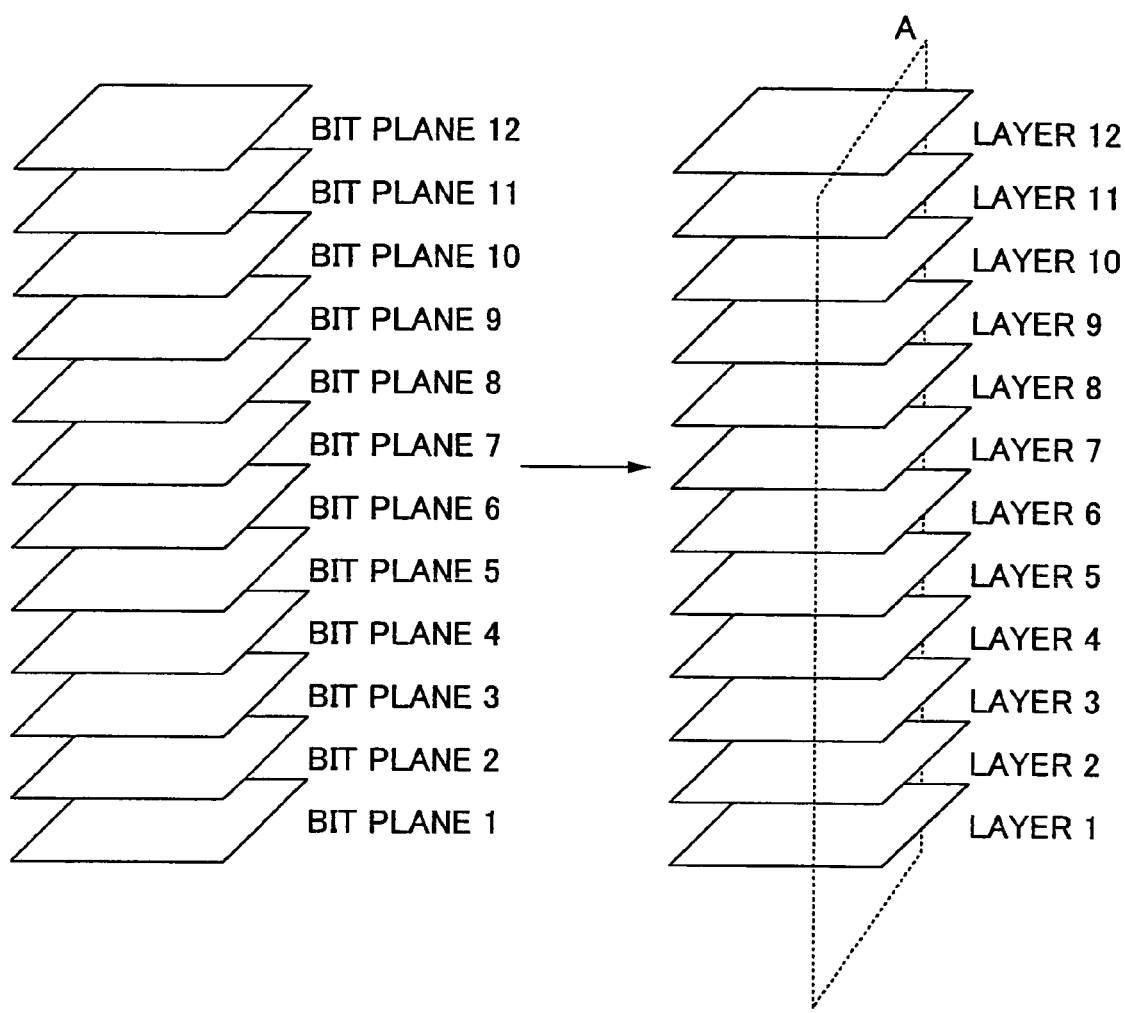
FIG. 8 is a schematic diagram showing bit planes and layers.

FIG. 8 is a schematic diagram showing bit planes 54 and corresponding layers according to an embodiment of the present invention. As described above, the code block 53 of the wavelet coefficient data 51 is divided into the bit planes 54. In the case of JPEG 2000, each bit plane is encoded with three paths (coding path) of the entropy code. The group of coding paths is called a layer. In this description, the group of coding paths is assumed to correspond to a layer to make the description easy. That is, it is assumed that the bit plane and a layer corresponding thereto are identical.

The truncation of layers (bit planes) will be discussed below.

Figures 9, 10:
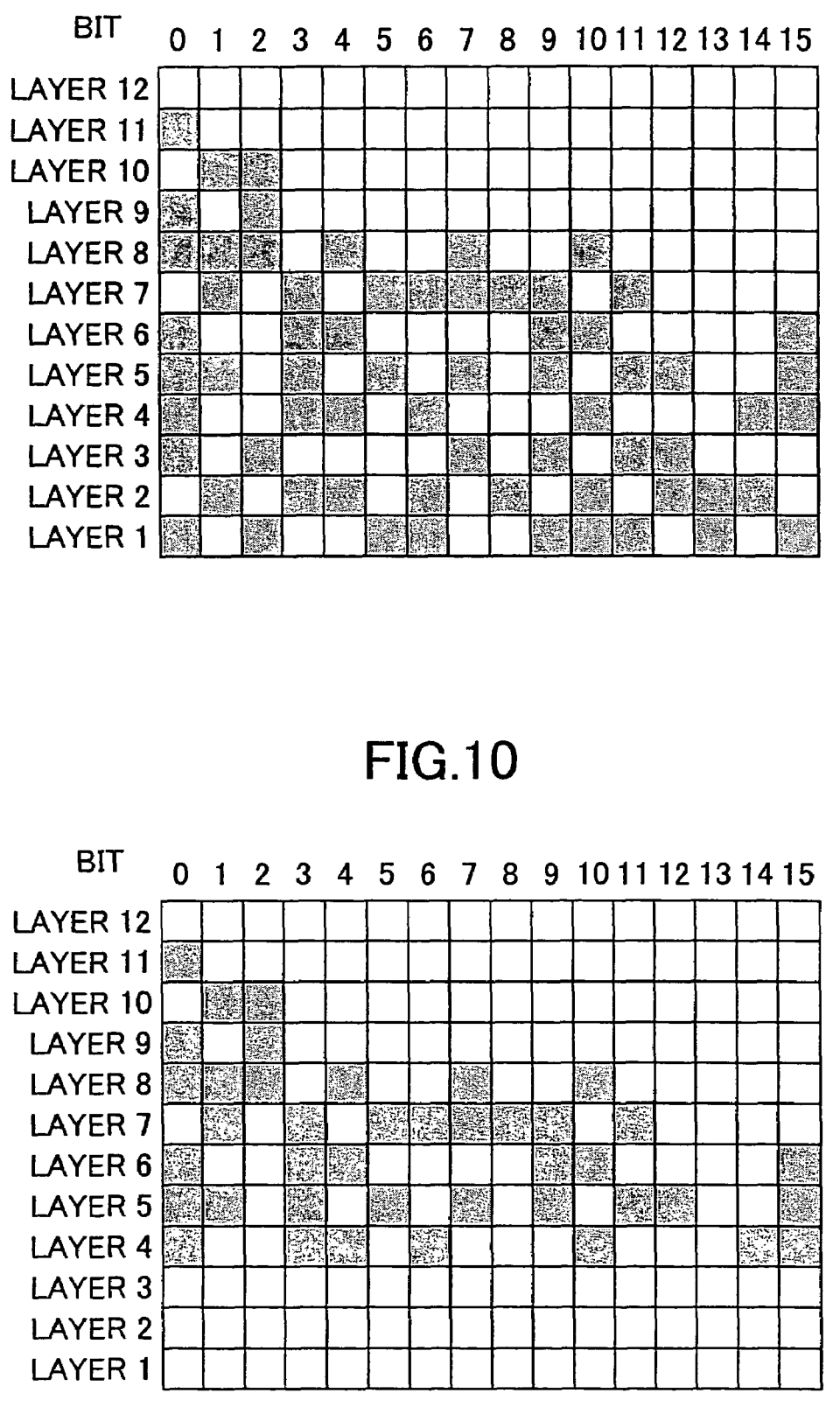

FIG. 9 is a schematic diagram showing the bit pattern of layers 1 through 12 in the case where the layers 1 through 12 are cut at a surface "A" as showed in FIG. 8. Though a layer is two dimensional, only one dimensional bit pattern will be described since the description of the one-dimensional case is easier and those skilled in the art will easily understand the two dimensional case base on the one-dimensional case. In FIG. 9, a box is white if the component corresponding thereto is ineffective (ineffective bit), and is black if the component corresponding thereto is effective (effective bit).

FIG. 10 shows the bit pattern in the case where the layers 1 through 3 are truncated. In this case, most of the effective components remain undeleted. FIG. 11 shows the bit pattern in the case where the layers 1 through 6 are truncated. In this case, even if the layers 1 through 6 are truncated, most of the most significant bits (MSBs) are not truncated. FIG. 12 shows the bit pattern in the case where the layers 1 through 7 are truncated. In this case, more than half data items are deleted due to the truncation. FIG. 13 shows the bit pattern in the case where the layers 1 through 8 are truncated. In this case, most of the data items are deleted.

FIG. 14 is the same schematic diagram as FIG. 9 except that the number of MSBs is indicated as "Na" for each layer and the number of MSBs each followed by the second most significant bit that is effective is indicated as "Nb" for each layer. FIG. 14 shows that many MSBs are distributed at the layer 7.

FIG. 15 and FIG. 16 illustrate other examples of bit patterns. The bit pattern showed in FIG. 15 gradually changes, and the MSBs are widely distributed over several layers. The bit pattern showed in FIG. 16, however, steeply changes between the bit 7 and 8. The MSBs are distributed at only layers 1 through 4 and layers 9 through 11.

In the case of FIG. 14, for example, if the layer 7 at which many MSBs are distributed is truncated, the data distribution of the code block of the layer substantially changes. That is, the more MSBs are deleted when a layer is truncated, the more the image quality degrades.

As described above, the number of MSBs of each layer is a parameter that indexes the degrading of the image quality. It is easy to obtain the number of MSBs from the wavelet coefficient data. Accordingly, one can evaluate the degrading of an image due to the truncation easily and quickly based on the number of MSBs.

Furthermore, when the bit planes of the encoded data are truncated, the degrading of an image due to the truncation of bit planes can be evaluated without decoding the encoded data encoded with the entropy code.

For example, if one obtains the number of MSBs of each bit plane in advance based on the wavelet coefficient data before encoded with the entropy code, and attaches the obtained number of MSBs to the wavelet coefficient data after the entropy encoding or stores the obtained number of MSBs in a storing unit, the one can evaluate, without entropy decoding, the degrading of the image due to truncations using the obtained number of MSBs that is attached or stored.

If one predicts the image distortion of the image due to the truncations of bit planes or a slope parameter (the ratio of the distortion of the image to the amount of reduced image data by the truncation), and attaches the predicted distortion or slope parameter, instead of the obtained number of MSBs, to the wavelet coefficient data after the entropy encoding or stores the predicted value in the storing unit, the one can evaluate, without entropy decoding, the degrading of the image due to the truncations using the predicted distortion or slope parameter that is attached or stored.

In the following description, the parameters that indicate the degrading of the image due to the truncation of bit planes such as the number of MSBs of each bit plane, the distortion of the image, and the slope parameter will be called "index parameter".

According to the first embodiment, the encoding unit 15 provides the index generating unit 71 with the wavelet coefficient data 51 before entropy encoding (referred to as "wavelet coefficient data 77 before entropy encoding") as showed in FIG. 7. The counting unit 72 provided in the index generating unit 71 counts the number (Na) of MSBs of each bit plane in the wavelet coefficient data 77 before entropy encoding.

According to the first embodiment, the counting unit 72 provides "Na" to the distortion predicting unit 73 and the slope parameter predicting unit 74 provided in the index generating unit 71 as showed in FIG. 7. The distorting predicting unit 73 and the slope parameter predicting unit 74 predict the distortion of the image and the slope parameter, respectively, based on "Na" provided from the counting unit 72.

In the case where bit planes 1 through "n" are truncated, the distortion value of the image of this case may be defined as the sum of "Na" multiplied by the level of each bit plane. For example, in the case of FIG. 11, the distortion value of the image is calculated as: 0×1+1×2+0×3+1×4+1×5+1×6=17. Accordingly, the slope parameter can be defined as the ratio of the above distortion value to the amount of data reduced by the truncation.

According to the first embodiment of the present invention, the encoding unit 15 provides the compressing unit 76 with the wavelet coefficient data 51 after entropy encoding (referred to as "wavelet coefficient data 78 after entropy encoding") as showed in FIG. 7. Additionally, the index generating unit 71 provides the compressing unit 76 with index values generated in advance such as the obtained "Na" and the predicted distortion. The compressing unit 76 determines bit planes to be truncated based on the index values provided by the index generating unit 71, and truncates the determined bit planes.

For example, one may set a predetermined threshold for each bit plane 54, and compare the index value generated by the index generating unit 71 with the predetermined threshold. The index value of the bit plane 1 is compared with corresponding threshold; the index value of the bit plane 2 is compared with corresponding threshold; and so on. If the index value of the bit plane "n" exceeds corresponding threshold for the first time, the bit planes 1 through "n-1" are determined to be truncated. If the index value of the bit plane 1 exceeds corresponding threshold, that is, n=1, no bit plane is truncated. The thresholds may be the same, or may be different.

As described above, the compressing unit 76 can determine, without entropy decoding, the bit planes to be truncated that does not degrade too much using the index values generated by the index generating unit 71.

According to the embodiment, the encoding unit 15 provides the index adding unit 75 with the wavelet coefficient data 78 after entropy encoding, and the index generating unit 71 provides the index adding unit 75 with the index values generated in advance as showed in FIG. 7 so that the index adding unit 75 can attach the index values to the wavelet coefficient data 78.

After attaching the index values to the wavelet coefficient data 78, the index adding unit 75 provides the compressing unit 76 with the wavelet coefficient data 78. The compressing unit 76 can determine the bit planes to be truncated based on the index values attached to the wavelet coefficient data 78 and truncate them.

Accordingly, the compressing unit 76 can determine, without entropy decoding, the bit planes 54 to be truncated using the index values attached to the wavelet coefficient data 78 generated by the index generating unit in advance, and can truncate the determined bit planes.

Figure 1:
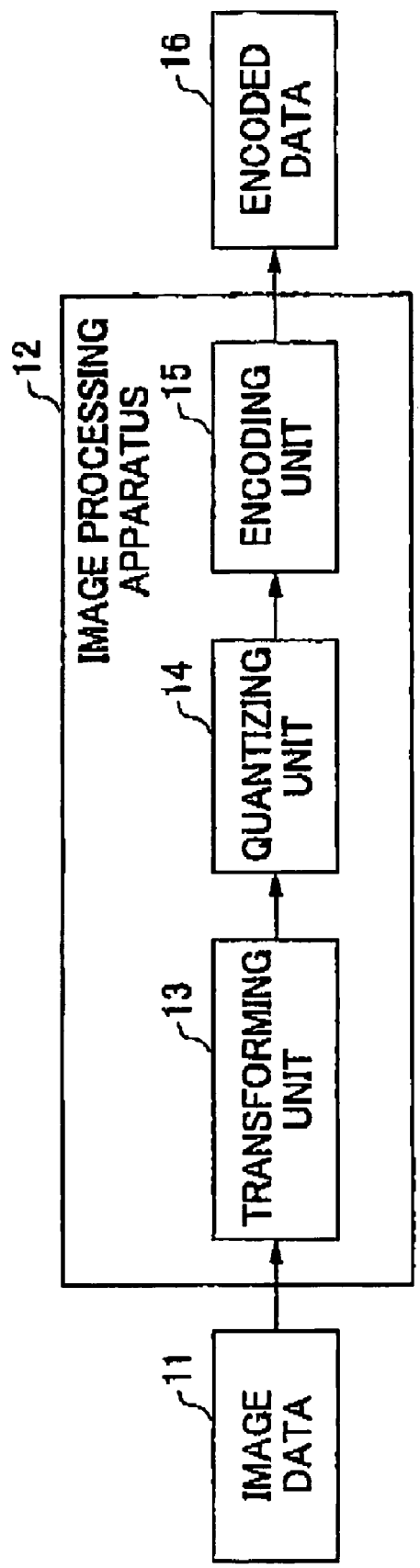
FIG. 1 is a block diagram showing an image processing apparatus that compresses image information with JPEG 2000.
Figure 2:
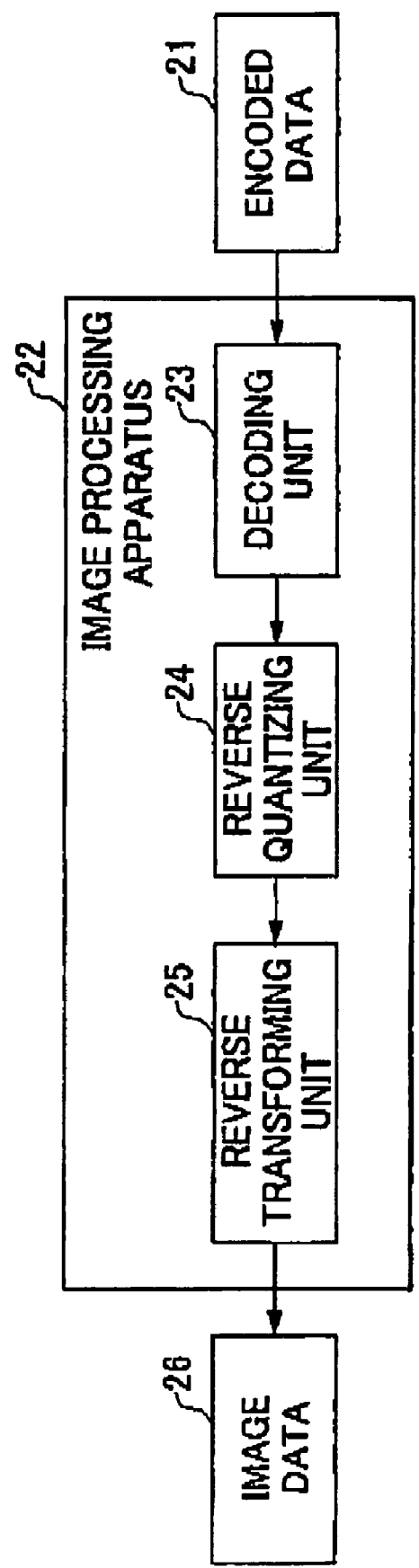
FIG. 2 is a block diagram showing an image processing apparatus that decompresses image information with JPEG 2000.
Figure 5A:
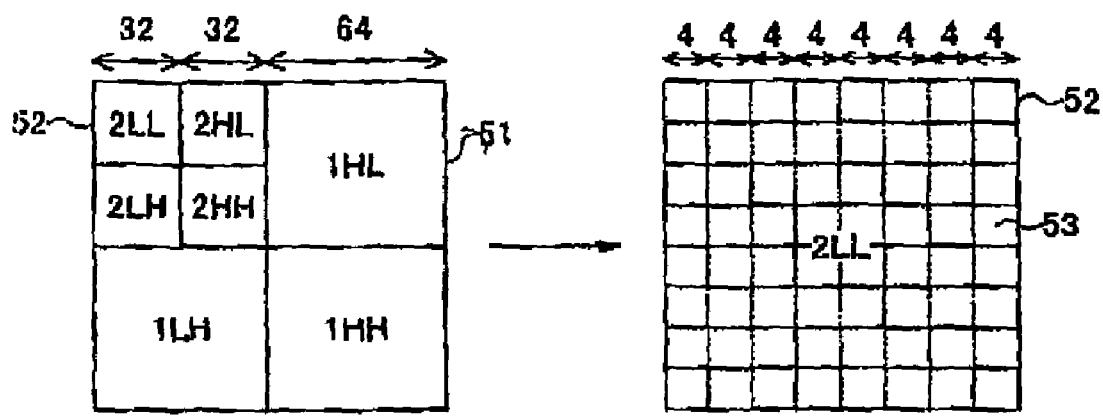
FIGS. 5A through 5C are schematic diagrams for explaining an encoding unit.
Figure 5B:
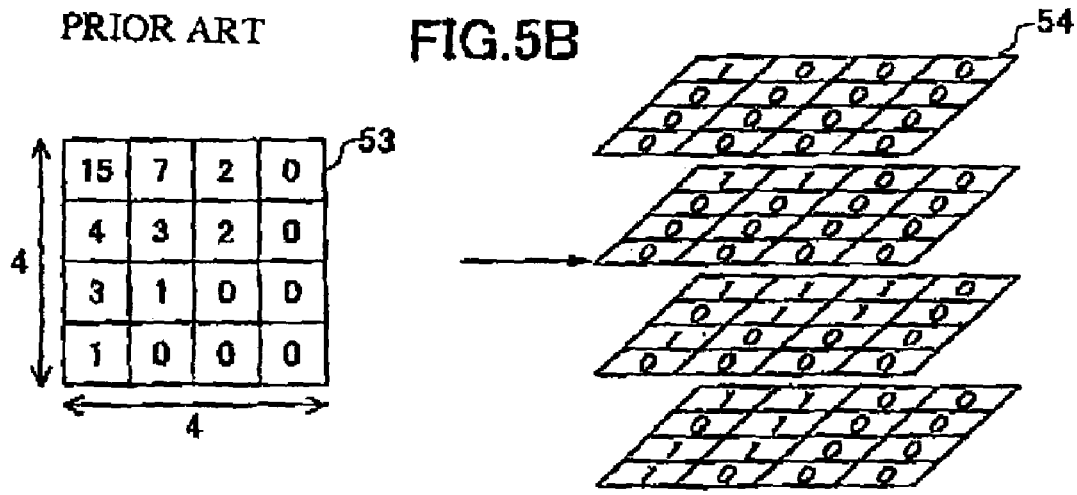
Figure 5C:
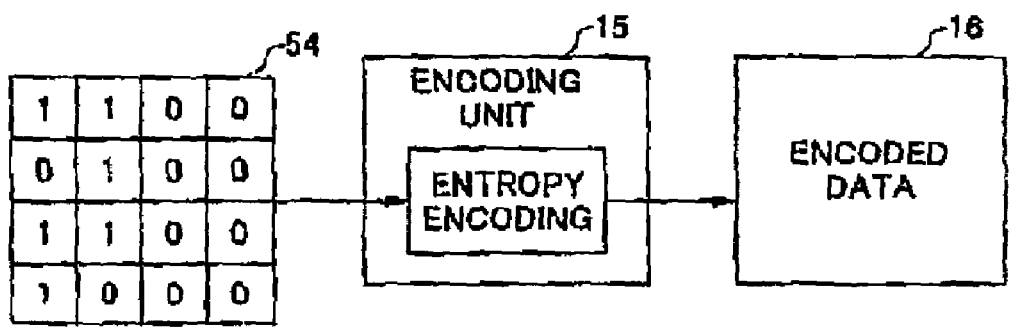
Figure 17:
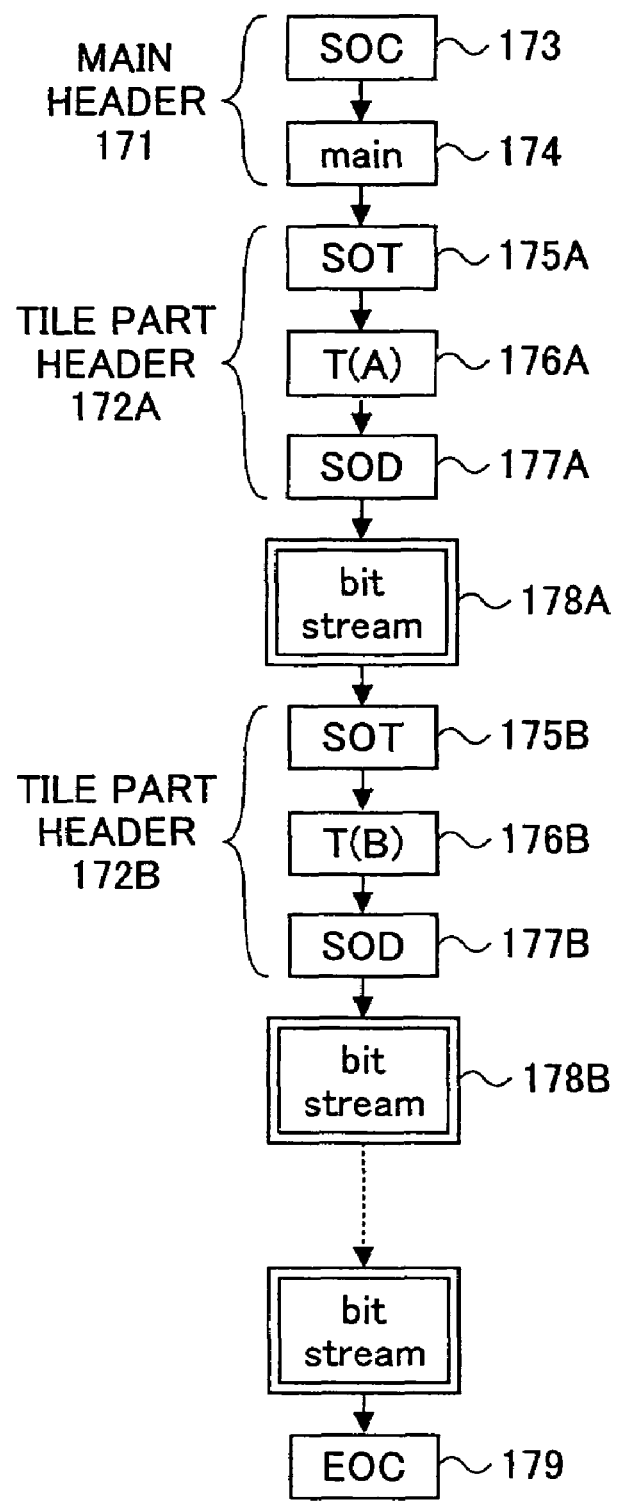
FIG. 17 illustrates the format of encoded wavelet coefficient data.

The wavelet coefficient data 78 after entropy encoding according to JPEG 2000 will be described below. FIG. 17 illustrates the format of the "wavelet coefficient data 78 after entropy encoding". The image processing apparatus showed in FIG. 1 outputs the encoded data 16 of this format.

In the case of the image processing apparatus according to the embodiment showed in FIG. 7, the wavelet coefficient data 78 after entropy encoding are further processed by the compressing unit 76, and are output as the encoded data 16.

In general and in this specification, the term "encoded data" includes not only the encoded data 16 output by the image processing apparatus but also the wavelet coefficient data 78 after entropy encoding.

The encoded data of FIG. 17 starts with a main header 171 including "start of codestream" (SOC) 173 and "main" 174 that is the body of the main header 171.

A tile part header 172A follows the main header 171. The tile part header includes a "start of tile" (SOT) 175A indicating the start of the tile part header 172S, a "tile (A) header maker segment" (T(A)) 176A indicating the content of the tile part header 172A, and a "start of data" (SOD) 177A indicating the start of data.

A bit stream 178A follows the tile part header 172A.

A plurality of tile part headers 172B, 172C, each followed by a bit stream 178B, 178C, . . . , respectively follows the bit stream 178A, if applicable. The "end of codestream" (EOC) 179 indicating the end of the codestream follows the last bit stream.

Figure 18:
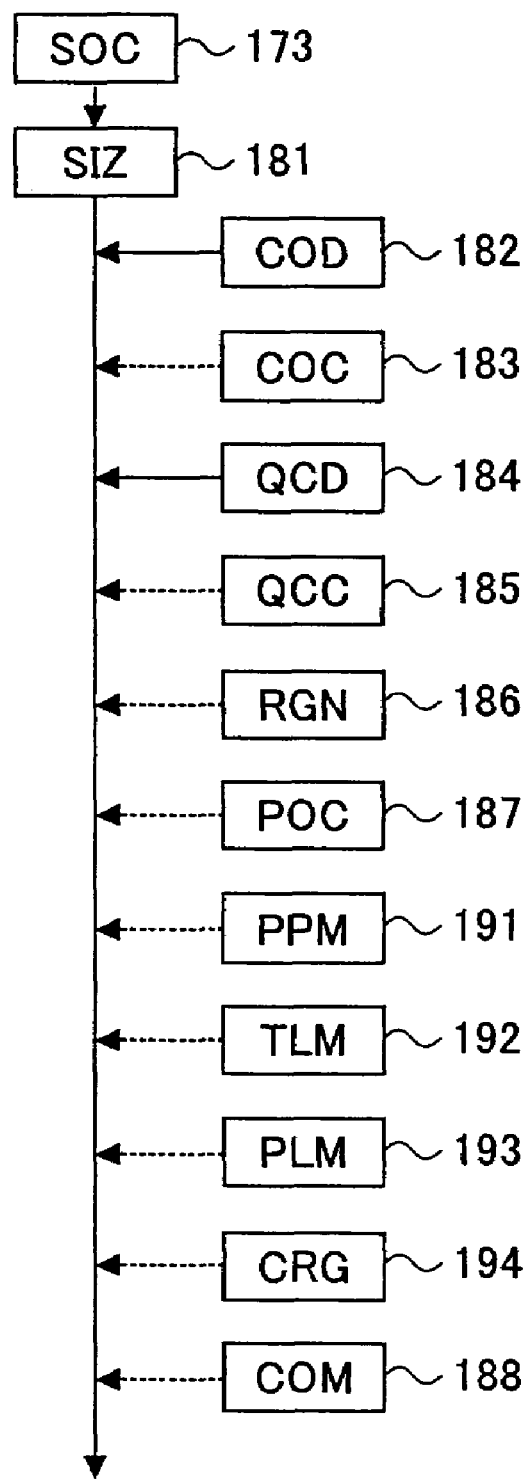
FIG. 18 illustrates the configuration of a main header.

FIG. 18 illustrates the configuration of the main header 171. As described above, the main header 171 starts with SOC 173 followed by a marker SIZ (image and tile size) 181 indicating the size. SIZ 181 is followed by the following markers in an arbitral order: COD (coding style default) 182 required for encoding and decoding, COC (coding style component) 183, QCD (quantization default) 184 required fro quantizing and reverse quantizing, QCC (quantization component) 185, RGN (region of interest) 186, POC (order charge) 187, PPM (packed packet headers) 191, TLM (tile lengths) 192, PLM (packet lengths) 193, CRG (component registration) 194, and COM (component) 188, where SIZ, COD, and QCD are required but the others are optional.

Figure 19:
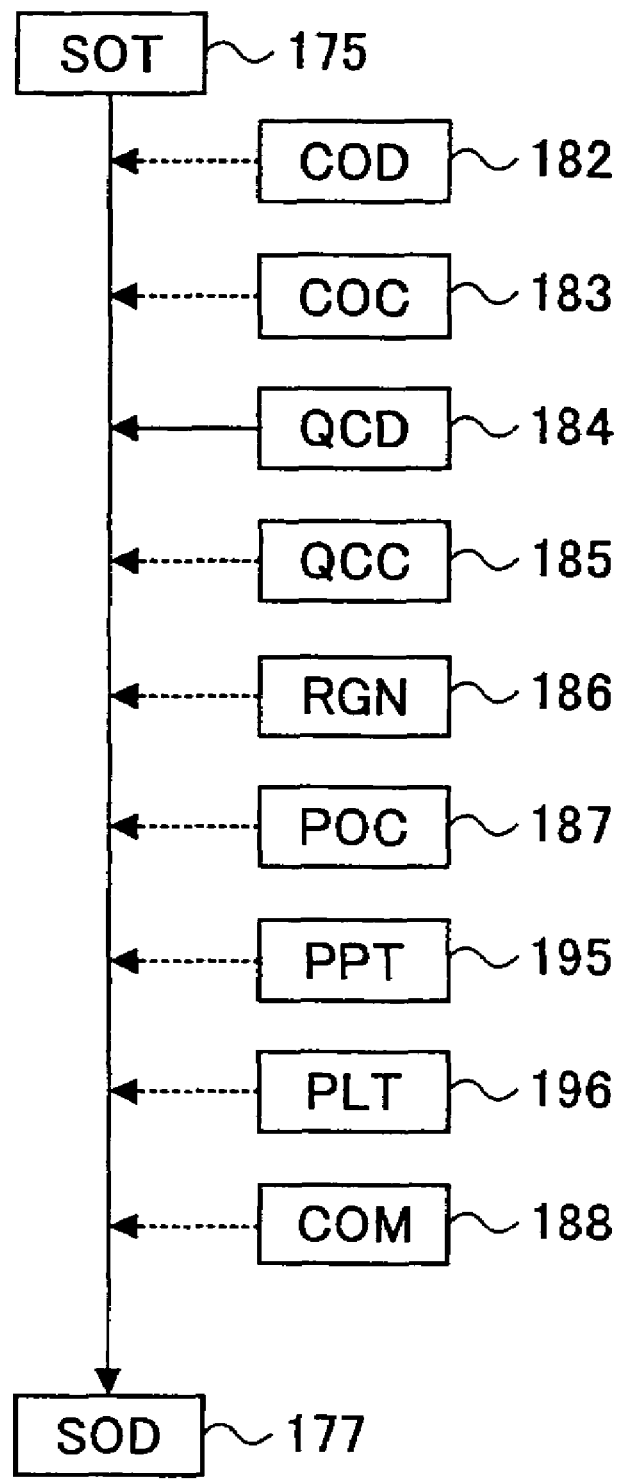
FIG. 19 illustrates the configuration of a tile part header.

FIG. 19 illustrates the configuration of the tile part header 172. The tile part header 172 starts with SOT 175 followed, in any order, by the following markers: COD 182, COC 183, QCD 184, QCC 185, RGN 186, POC 187, PPT (packed packet headers, tile header) 195, PLT (packet lengths, tile header) 196, and COM 188, where QCD 184 is required and the other markers are optional. Then, SOD 177 follows the above markers.

As described above, the index adding unit 75 attaches the index values generated by the index generating unit 71 to the encoded data of JPEG 2000. According to the current format of the encoded data of JPEG 2000, one can insert a comment marker in which the one can store comment text in the encoded data of JPEG 2000. The index values can be stored in the comment marker. The comment marker may be provided in the main header 171 or the tile part header 172. Otherwise, the comment marker may be provided in a header dedicated for the comment marker.

In the above description, the bit plane of (quantized) wavelet coefficient data is considered. The present invention, however, is also applicable to the bit plane of other image information.

In the above description, the number of MSBs of each bit plane and so forth are used as an index parameter. The present invention, however, is not limited to those index parameters described above, and can use any parameter that indexes the degrading of the image due to the truncation of bit planes.

For example, the present invention can use the distortion and/or the slope parameter caused by the truncation of the bit planes using the methods described in the EG of JPEG 2000 as the index parameters. One can provide a distortion obtaining unit and/or a slope parameter obtaining unit instead of the counting unit 72 in the image processing apparatus according to the embodiment.

In the above description, it is assumed that the image data are compressed with JPEG 2000. The present invention, however, is not limited to JPEG 2000, and is applicable to any other image compression method in which the image information is encoded by the bit plane, and the encoded image information are compressed by truncating the bit planes.

Additionally, the present invention is not limited to the case where the image information is encoded by the bit plane, and the encoded image information is compressed by truncating the bit planes. The present invention is also applicable to the case where the image information is encoded part by part, and the each encoded part of the image information is compressed by reducing the encoded part The present invention is also applicable to audio information such as voice data instead of the image information such as the image data.

SECOND EMBODIMENT

An MSB embodies a half of the amount of information contained in a data item. If the second most significant bit (second MSB), that is, the bit subsequent to the MSB is "1" (effective bit), the MSB and the second MSB holds ½ through ¾, in total, of the amount of information contained in the data item. If the second MSB is otherwise "0", the MSB and the second MSB hold ¾ through 1 of the amount of information contained in the data item in total. Accordingly, the distortion of an image can be evaluated more accurately based on not only the number (Na) of MSBs but also the number (Nb) of MSBs followed by second MSB that is 1. For example, one may assume that an MSB followed by a second MSB that is 0 is 1.5 times effective on the degrading of the image than an MSB followed by a second MSB that is 1, in other words, the MSB followed by a second MSB that is 0 corresponds to 1.5 MSBs followed by a second MSB that is 1.

When predicting the distortion of an image and the slope parameter, the distortion predicting unit 73 and the slope parameter predicting unit 74 may not necessarily handle all code blocks equally. The distortion predicting unit 73 and the slope parameter predicting unit 74 may weight each code block based on the component and the sub band so that the degrading of the image can be accurately evaluated.

If the encoding unit 15 can compress with entropy encoding the wavelet coefficient data 51 at a compression rate more than desired one, the compressing unit 76 does not need to truncate the bit planes. The compressing unit 76 does not need in this case to attach the index value to the wavelet coefficient data 51.

The index adding unit 75 attaches the index value to the wavelet coefficient data 51, but can be selectively set, in response to an instruction from an exterior, not to attach the index value to the wavelet coefficient data 51 so as not to lower the compression rate by attaching the index value unnecessarily.

When a plurality of code blocks in a sub band is truncated at different truncation level, the truncation sometimes causes visible distortion between the code blocks. To solve this problem, the truncation is generally executed by the sub band instead of code block. When the truncation is executed by the sub band, one can obtain the number of MSBs by the sub band instead of by the code block so as to reduce required calculation.

The preferred embodiments of the present invention are described above. The present invention is not limited to these embodiments, but various variations and modifications may be made without departing from the scope of the present invention.

This patent application is based on Japanese Laid-open Patent Application No. 2002-128682 filed on Apr. 30, 2002, the entire contents of which are hereby incorporated by reference.

INDUSTRY APPLICABILITY

In the case of JPEG 2000, for example, image information is encoded by the bit plane, and is compressed by truncating the bit planes of the encoded image information. When truncating the encoded bit planes, one can evaluate, using the method of processing image information according to the present invention, the degrading of the image information caused by the truncation without decoding the encoded image information.

The invention claimed is:

1. A method of processing image information, comprising the steps of:
   encoding said image information by a bit plane;
   generating, by an image processing apparatus, an index parameter indexing degradation of said image information caused by truncation of one or more bit planes based on said image information;
   compressing, by the image processing apparatus, said image information by truncating the bit planes determined based on said index parameter; and
   counting a number of most significant bits of each bit plane of said image information before encoding;
   wherein said index parameter is said number of most significant bits of each bit plane.

2. The method as claimed in claim 1, further comprising the step of predicting distortion of said image information caused by the truncation of the bit planes based on said number of most significant bits of each bit plane, wherein said index parameter contains the predicted distortion.

3. The method as claimed in claim 2, further comprising the step of predicting a slope parameter of said distortion of said image information caused by the truncation of the bit planes based on said number of most significant bits of each bit plane, wherein said index parameter contains the predicted distortion and the predicted slope parameter.

4. The method as claimed in claim 1, further comprising the step of obtaining an amount of distortion of said image information caused by the truncation of the bit planes based on said image information before encoding, wherein said index parameter contains the obtained amount of distortion.

5. The method as claimed in claim 4, further comprising the step of obtaining a slope parameter of said distortion of said image information caused by the truncation of the bit planes based on said image information before encoding, wherein said index parameter contains the obtained amount of distortion and the obtained slope parameter.

6. The method as claimed in claim 1, wherein said image information is compressed with JPEG 2000.

7. The method as claimed in claim 1, wherein said image information is compressed with JPEG 2000; and the generated index parameter is stored in a comment marker of the encoded image information.

8. The method as claimed in claim 7, wherein said comment marker is provided in a main header or a tile part header of the encoded image information.

9. An image processing apparatus, comprising:
   an encoding unit that encodes image information by a bit plane;
   an index generating unit that generates index parameter indexing degradation of said image information caused by truncation of one or more bit planes based on said image information;
   a compressing unit that compresses said image information by truncating the bit planes determined based on said index parameter;
   a counting unit that counts a number of most significant bits of each bit plane of said image information before encoding, wherein said index parameter contains said number of most significant bits of each bit plane; and
   an index attaching unit that attaches said index parameter to the encoded image information;
   wherein the bit planes to be truncated are determined based on the attached index parameter.

10. An image processing apparatus, comprising:
    an encoding unit that encodes image information by a bit plane;
    an index generating unit that generates index parameter indexing degradation of said image information caused by truncation of one or more bit planes based on said image information;
    a compressing unit that compresses said image information by truncating the bit planes determined based on said index parameter; and
    a counting unit that counts a number of most significant bits of each bit plane of said image information before encoding;
    wherein said index parameter contains said number of most significant bits of each bit plane.

11. An image processing apparatus, comprising:
    an encoding unit that encodes image information by a bit plane;
    an index generating unit that generates index parameter indexing degradation of said image information caused by deletion of one or more portions of said image information;
    a compressing unit that compresses said image information by deleting the portions determined based on said index parameter;
    a counting unit that counts a number of most significant bits of each bit plane of said image information before encoding, wherein said index parameter contains said number of most significant bits of each bit plane; and
    an index attaching unit that attaches said index parameter to the encoded image information;
    wherein the portions to be deleted are determined based on said index parameter.

12. A computer readable medium tangibly embodying a program that causes a computer to process image information utilizing a method comprising the steps of:
    encoding said image information by a bit plane;
    generating index parameter indexing degradation of said image information caused by truncation of one or more bit planes based on said image information;
    compressing said image information by truncating the bit planes determined based on said index parameter;
    counting a number of most significant bits of each bit plane of said image information before encoding, wherein said index parameter is said number of most significant bits of each bit plane; and
    attaching said index parameter to the encoded image information;
    wherein the bit planes to be truncated are determined based on the attached index parameter.

13. A method of processing audio information, comprising the steps of:
    encoding said audio information by a bit plane;
    generating, by an audio processing apparatus, index parameter indexing degradation of said audio information caused by deletion of one or more portions of said audio information;
    compressing, by the audio processing apparatus, said audio information by deleting the portions determined based on said index parameter;
    counting a number of most significant bits of each bit plane of said audio information before encoding, wherein said index parameter is said number of most significant bits of each bit plane; and
    attaching said index parameter to the encoded audio information;
    wherein the portions to be deleted are determined based on said index parameter.

14. An audio processing apparatus, comprising:
- an encoding unit that encodes audio information by a bit plane;
- an index generating unit that generates index parameter indexing degradation of said audio information caused by deletion of one or more portions of said audio information;
- a compressing unit that compresses said audio information by deleting the portions determined based on said index parameter;
- a counting unit that counts a number of most significant bits of each bit plane of said audio information before encoding, wherein said index parameter contains said number of most significant bits of each bit plane; and
- an index attaching unit that attaches said index parameter to the encoded audio information;
- wherein the portions to be deleted are determined based on said index parameter.

15. A computer readable medium tangibly embodying a program that causes a computer to process audio information utilizing a method comprising the steps of:
- encoding said audio information by a bit plane;
- generating index parameter indexing degradation of said audio information caused by deletion of one or more portions of said audio information;
- compressing said audio information by deleting the portions determined based on said index parameter;
- counting a number of most significant bits of each bit plane of said audio information before encoding, wherein said index parameter contains said number of most significant bits of each bit plane; and
- attaching said index parameter to the encoded audio information;
- wherein the portions to be deleted are determined based on said index parameter.

16. A computer readable medium tangibly embodying a program that causes a computer to process image information utilizing a method comprising the steps of:
- encoding said image information by a bit plane;
- generating index parameter indexing degradation of said image information caused by deletion of one or more portions of said image information;
- compressing said image information by deleting the portions determined based on said index parameter;
- counting a number of most significant bits of each bit plane of said image information before encoding, wherein said index parameter is said number of most significant bits of each bit plane; and
- attaching said index parameter to the encoded image information;
- wherein the portions to be deleted are determined based on said index parameter.

17. The image processing apparatus as claimed in claim 10, further comprising:
- a distortion predicting unit configured to predict distortion of said image information caused by the truncation of the bit planes based on said number of most significant bits of each bit plane,
- wherein said index parameter generated by said index generating unit contains the predicted distortion.

18. The image processing apparatus as claimed in claim 10, further comprising:
- a slope parameter predicting unit configured to predict a slope parameter of said distortion of said image information caused by the truncation of the bit planes based on said number of most significant bits of each bit plane,
- wherein said index parameter generated by said index generating unit contains the predicted distortion and the predicted slope parameter.

19. The computer readable medium as claimed in claim 12, wherein said method further comprises predicting distortion of said image information caused by the truncation of the bit planes based on said number of most significant bits of each bit plane, wherein said index parameter contains the predicted distortion.

20. The computer readable medium as claimed in claim 12, wherein said method further comprises a slope parameter of said distortion of said image information caused by the truncation of the bit planes based on said number of most significant bits of each bit plane, wherein said index parameter contains the predicted distortion and the predicted slope parameter.

* * * * *